UNITED STATES PATENT OFFICE.

GEORGE BLARDONE, OF NEW ORLEANS, LOUISIANA.

PROCESS FOR THE REGENERATION OF DECOLORIZING-CARBONS.

1,327,222. Specification of Letters Patent. Patented Jan. 6, 1920.

No Drawing. Application filed July 9, 1917. Serial No. 179,577.

*To all whom it may concern:*

Be it known that I, GEORGE BLARDONE, a citizen of the United States, residing at New Orleans, in the parish of Orleans and State of Louisiana, have invented certain new and useful Improvements in Processes for the Regeneration of Decolorizing - Carbons, of which the following is a specification.

This invention relates to a process for the regeneration or revivification of carbons intended for employment in processes for the decolorization, deodorization, and clarification of raw materials, such, for example, as raw sugars or syrups.

When a decolorizing carbon has been employed in such a process for a short length of time its particles become impregnated with pectins and other gummy substances which mask the particles in such a manner as to greatly detract from, if not to entirely destroy, the decolorizing power of the carbon. Therefore, in order that a decolorizing carbon may be repeatedly employed it is necessary that it be regenerated or revivified by a treatment which will remove or destroy the pectins and other gummy substances which it has taken up during the decolorizing process. The gummy substances present in the raw material to be decolorized consist largely of complex carbohydrates, or in other words, compounds containing carbonyl groups. I have found that all of these compounds are capable of forming addition compounds when treated with sulfurous acid and with sulfites or bisulfites.

As an example of my process, I have obtained excellent results by the carrying out an experiment as follows: 100 cc. of a molasses solution was boiled for one minute with two grams of carbon obtained by burning rice chaff or hulls. The carbon was then filtered off and washed with water and finally dried. The carbon in this state had absorbed pectins and other gummy substances and represented, in effect, a carbon which had been employed for a considerable length of time in a sugar refining process. In this state the carbon was boiled for thirty minutes with 200 cc. of a ten per cent. solution of sodium bisulfite. A two per cent. solution of sulfurous acid (cold) was employed with good results. However the strength of the sulfurous acid may be varied. Heat may also be employed in the process. The regenerated or revivified carbon was then separated by filtration and was washed and finally dried and upon employment in decolorizing 100 cc. of a molasses solution was found to give excellent results.

While sodium bisulfite is above given as an example of a bisulfite that could be employed, it will be understood that sulfurous acid reduced to the required strength may also be employed as well as other bisulfites or sulfites. It will also be understood that while the carbon treated by the experiment consisted of burnt chaff and hulls of rice, the process is adaptable for the treatment of any other vegetable, animal or mineral charcoal or carbonaceous materials.

As a substitute for the sodium bisulfite mentioned it may be found desirable, from a commercial standpoint to employ calcium bisulfite. Also in carrying out the process the weight of the solution of bisulfite or sulfite employed should at least equal the weight of the carbon.

Having thus described the invention, what is claimed as new is:

1. That process for the regeneration or revivification of decolorizing and deodorizing carbons which consists in washing the said carbon with a solution of sodium bisulfite.

2. That process for the regeneration or revivification of decolorizing and deodorizing carbons which consists in treating the said carbon with a solution of a sulfite.

3. That process for the regeneration or revivification of decolorizing and deodorizing carbons which consists in treating the said carbon with a solution of a bisulfite.

In testimony whereof I affix my signature.

GEORGE BLARDONE. [L. S.]